(12) United States Patent
Lee et al.

(10) Patent No.: US 8,451,757 B2
(45) Date of Patent: May 28, 2013

(54) METHOD FOR RECEIVING PREAMBLE FROM OTHER COMMUNICATION SYSTEM AND METHOD FOR ADAPTIVELY CHANGING THE MEASUREMENT GAP TO DISCOVER THE OTHER COMMUNICATION SYSTEM

(75) Inventors: Jin Lee, Gyeonggi-do (KR); Yong Ho Kim, Gyeonggi-do (KR); Tae Gon Kong, Gyeonggi-do (KR); Gi Won Park, Gyeonggi-do (KR); Chang Hun Lee, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 375 days.

(21) Appl. No.: 12/678,949

(22) PCT Filed: Sep. 18, 2008

(86) PCT No.: PCT/KR2008/005513
§ 371 (c)(1),
(2), (4) Date: Mar. 18, 2010

(87) PCT Pub. No.: WO2009/038359
PCT Pub. Date: Mar. 26, 2009

(65) Prior Publication Data
US 2010/0208674 A1  Aug. 19, 2010

(30) Foreign Application Priority Data
Sep. 21, 2007  (KR) .................. 10-2007-0097042

(51) Int. Cl.
*H04B 7/00* (2006.01)

(52) U.S. Cl.
USPC .......................................................... 370/310

(58) Field of Classification Search
None
See application file for complete search history.

(56) References Cited

U.S. PATENT DOCUMENTS

| 6,606,341 | B1 |  | 8/2003 | Kanterakis et al. |  |
|---|---|---|---|---|---|
| 7,117,003 | B2 |  | 10/2006 | Kayama et al. |  |
| 2003/0224730 | A1 | * | 12/2003 | Muszynski et al. | 455/62 |
| 2007/0097914 | A1 | * | 5/2007 | Grilli et al. | 370/329 |
| 2008/0043679 | A1 | * | 2/2008 | Karlsson et al. | 370/335 |
| 2008/0274742 | A1 | * | 11/2008 | Bi | 455/437 |
| 2009/0005095 | A1 | * | 1/2009 | Chun et al. | 455/509 |

* cited by examiner

*Primary Examiner* — Raj Jain
(74) *Attorney, Agent, or Firm* — Birch, Stewart, Kolasch & Birch, LLP

(57) ABSTRACT

A method for receiving a preamble signal of another communication system and a method for adaptively changing a measurement gap to discover another communication system are disclosed. A method for receiving a preamble signal from a base station of a second communication system by a communicating mobile station in a first communication system includes receiving measurement gap scheduling information from a base station of the first communication system, if a preamble signal of the second communication system is not received during an assigned measurement gap, changing the measurement gap, and receiving the preamble signal of the second communication system during the changed measurement gap.

11 Claims, 9 Drawing Sheets

METHOD FOR RECEIVING PREAMBLE FROM OTHER COMMUNICATION SYSTEM AND METHOD FOR ADAPTIVELY CHANGING THE MEASUREMENT GAP TO DISCOVER THE OTHER COMMUNICATION SYSTEM

TECHNICAL FIELD

The present invention relates to a mobile communication system, and more particularly, to a method for receiving a preamble signal from other communication system and a method for adaptively changing a measurement gap to discover other communication system.

BACKGROUND ART

A worldwide interoperability for microwave access (WiMAX) system has a variety of frame lengths of 2, 5, 10, and 20 ms. When a minimum frame size is assigned for a measurement gap to discover a preamble of a frame start position, the opportunity to discover the preamble is given at least once. However, in the WiMAX system having a frame size of 20 ms, if a mobile station of a long term evolution (LTE) system successively consumes 20 ms or more in order to discover an adjacent WiMAX base station, the mobile station may encounter a serious service delay. Accordingly, a method of reducing the size of one measurement gap and assigning the measurement gap at regular patterns or randomly has been proposed.

FIG. 1 is a view illustrating a process for discovering a preamble of an adjacent WiMAX base station according to a measurement gap size while a mobile station of an LTE system provides an evolved universal terrestrial radio access network (E-UTRAN) service.

Referring to FIG. 1, ⓐ shows a case where one measurement gap size is 5 ms and half of one radio frame of 10 ms is assigned for a measurement gap. The measurement gap of 5 ms is randomly assigned within one radio frame and WiMAX preambles are detected in the second and fourth measurement gaps. However, since the third and fourth measurement gaps are successively assigned, the mobile station can not receive an E-UTRAN service for a total of 10 ms. Therefore, as shown in ⓑ of FIG. 1, one measurement gap size may be reduced to 2.5 ms and a measurement gap may be randomly assigned within one radio frame. However, since a time assigned for the measurement gap is less than the case of ⓐ, a time for discovering the WiMAX preamble may be delayed.

When handover is performed in the LTE system, it is necessary to determine a channel measurement interval to recognize the existence of an adjacent base station and to report a channel state. However, in the case where a candidate base station differs from a currently connected base station in frequency or radio access technology (RAT), there has been no way to allocate an interval for discovering adjacent base stations and measuring a channel state of corresponding base stations while minimizing a service interruption time with the currently connected base station.

DISCLOSURE

Technical Problem

An object of the present invention devised to solve the problem lies in providing a method for receiving a preamble signal of another communication system and a method for adaptively changing a measurement gap to discover another communication system.

Technical Solution

The object of the present invention can be achieved by providing a method for receiving a preamble signal from a base station of a second communication system by a communicating mobile station in a first communication system. The method includes receiving measurement gap scheduling information from a base station of the first communication system, if a preamble signal of the second communication system is not received during an assigned measurement gap, changing the measurement gap, and receiving the preamble signal of the second communication system during the changed measurement gap.

In another aspect of the present invention, provided herein is a method for receiving a preamble from a base station of a second communication system by a communicating mobile station in a first communication system, including, if a preamble signal of the second communication system is not received during a measurement gap assigned from a base station of the first communication system, adaptively changing the measurement gap, receiving the preamble signal of the second communication system during the changed measurement gap and re-changing the changed measurement gap to correspond to a transmission period of the preamble signal, and further receiving the preamble signal of the second communication system during the re-changed measurement gap to obtain channel information for the base station of the second communication system.

In a further aspect of the present invention, provided herein is a method for adaptively determining a measurement gap to discover another communication system, including receiving measurement gap scheduling information having random characteristics assigned from a base station, if a preamble signal of another communication system is not received during the measurement gap having the random characteristics, adaptively changing the measurement gap, and if the preamble signal of another communication system is received during the changed measurement gap, re-changing the measurement gap to correspond to a transmission period of the preamble signal.

In the above aspects of the present invention, no signal may be transmitted and received to and from the base station of the first communication system during the measurement gap.

The measurement gap scheduling information may include a measurement gap size and a measurement gap assignment element. The changing the measurement gap may change at least one of the measurement gap size and the measurement gap assignment element.

The measurement gap assignment element may include at least one of a measurement gap interval, a measurement window, and the number of times measurement is performed during the measurement window.

The measurement gap scheduling information may be index information based on a measurement gap pattern table in which measurement gap scheduling parameter values are set.

The changed measurement gap after the preamble signal of the second communication system is received may be re-changed to correspond to a preamble transmission period of the second communication system.

In the above first aspect of the present invention, the method may further includes transmitting base station identification information obtained from the preamble signal of the second communication system to the base station of the first communication system, and receiving system information for the second communication system from the base station of the first communication system.

In the above three aspects of the present invention, the mobile station may further receive the preamble signal of the second communication system at least once to obtain channel quality information for the second communication system. Further, if a value of the obtained channel quality information for the second communication system is above a prescribed reference, the mobile station may perform handover to the base station of the second communication system.

Advantageous Effects

The present invention provides a scheduling method of a measurement gap for discovering other systems to a mobile station, thereby effectively assuring mobility of the mobile station. Moreover, the measurement gap is efficiently re-scheduled to raise the probability of detecting a preamble signal of another system. In addition, a time for the mobile station to discover another system can be minimized.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering around specific terms, but the present invention is not limited thereto and any other terms may be used to represent the same meanings.

In some instances, known structures and/or devices are omitted or are shown in block diagram and/or flow chart form, focusing on important features of the structures and/or devices, so as not to obscure the concept of the present invention. The same reference numbers will be used throughout this specification to refer to the same or like parts.

Exemplary embodiments described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a mobile station. Here, the term 'base station' refers to a terminal node of a network communicating directly with the mobile station. In some cases, a specific operation described as performed by the base station may be performed by an upper node of the base station. Namely, it is apparent that, in a network comprised of a plurality of network nodes including a base station, various operations performed for communication with a mobile station may be performed by the base station, or other network nodes except for the base station. The term 'base station' may be replaced with the term 'fixed station', 'Node B', 'eNode B' (eNB), 'access point', etc. The term 'mobile station' may be replaced with the term 'mobile terminal', 'user equipment' (UE), 'mobile subscriber station' (MSS), etc.

Figure 2:
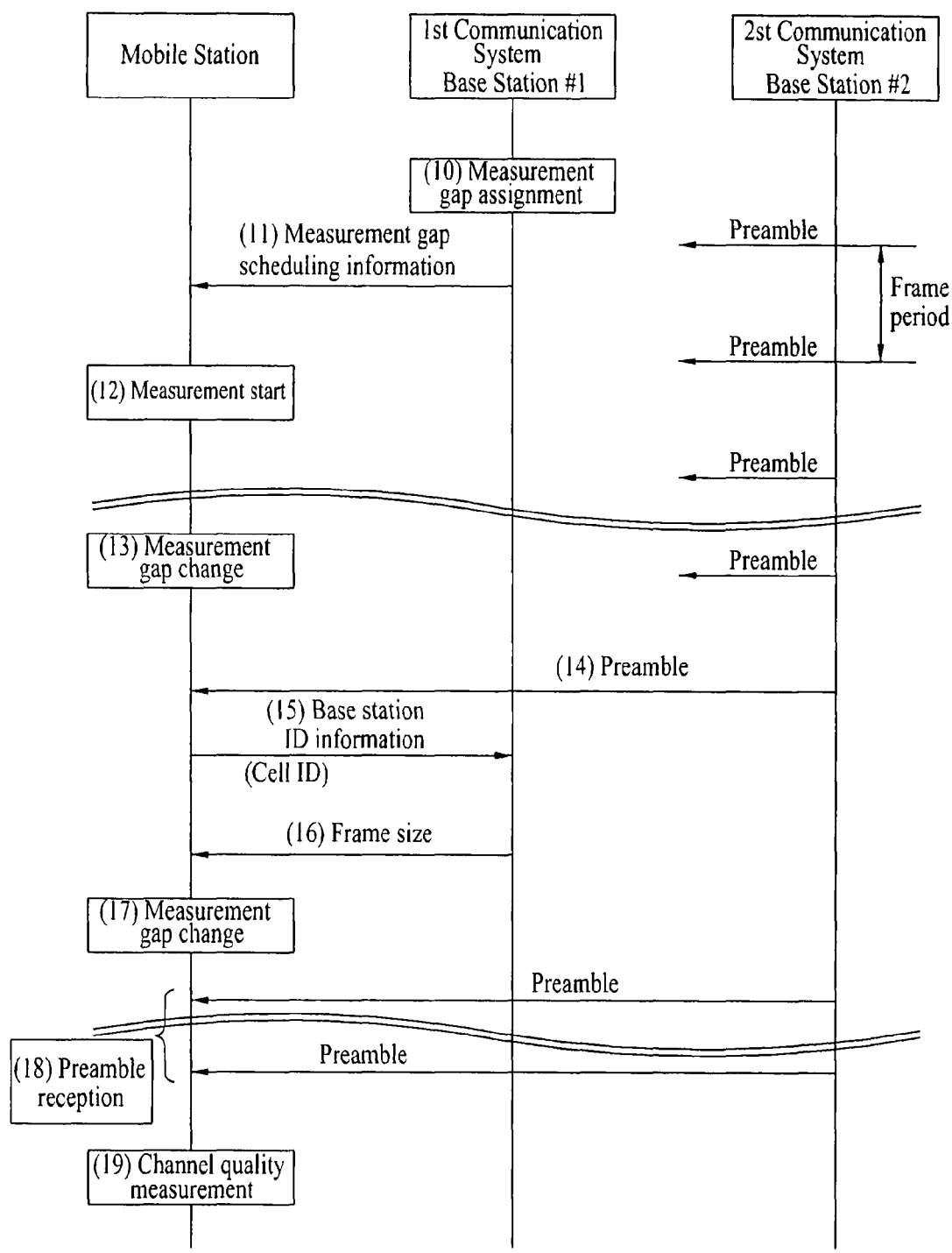
FIG. 2 is a flow chart illustrating a method for discovering another communication system according to an exemplary embodiment of the present invention.

FIG. 2 is a flow chart illustrating a method for discovering another communication system according to an exemplary embodiment of the present invention.

A method for a mobile station which is communicating with a base station #1 in a first communication system to discover a second base station #2 of a second communication system which is an adjacent base station will be described with reference to FIG. 2.

A method for recognizing a corresponding communication system by receiving a preamble signal transmitted periodically by a base station of another communication system may be an example of a method for discovering another communication system. The preamble is a signal which is transmitted first in a frame transmitted by the base station and has a regular pattern. Therefore, a mobile station receiving the preamble can recognize the base station transmitting the preamble. The mobile station can also estimate timing for an initial symbol, detect the frame, and adjust time and frequency synchronization, using the periodically transmitted preamble signal.

First, a base station #1 assigns a measurement gap for a mobile station in step 10. The measurement gap may be assigned by a request of the mobile station or by decision of the base station. The base station #1 transmits scheduling information as to measurement gap assignment, that is, measurement gap scheduling information to the mobile station in step 11. The mobile station receives the information about the measurement gap from the base station #1 and starts measurement in step 12. Namely, the mobile station monitors whether a preamble is detected which is transmitted by other base stations during an assigned measurement gap from frames started after the measurement gap scheduling information is received.

If the mobile station does not discover another base station during the measurement gap assigned by the base station for a prescribed time period, the mobile station changes the measurement gap in step 13. Various methods may be applied to change the measurement gap according to scheduling parameters determining the measurement gap. It is desirable to change the measurement gap if the probability of discovering another base station is higher than the probability when using the measurement gap assigned by the base station.

A process of changing the measurement gap may be performed by receiving the measurement gap scheduling information, which is scheduled by the base station and changed by the base station. Alternatively, the process of changing the measurement gap may be performed by the mobile station itself without additional scheduling information or any direction from the base station. If the mobile station changes the measurement gap, it is desirable to share the information about the changed measurement gap with the base station.

Figure 1:
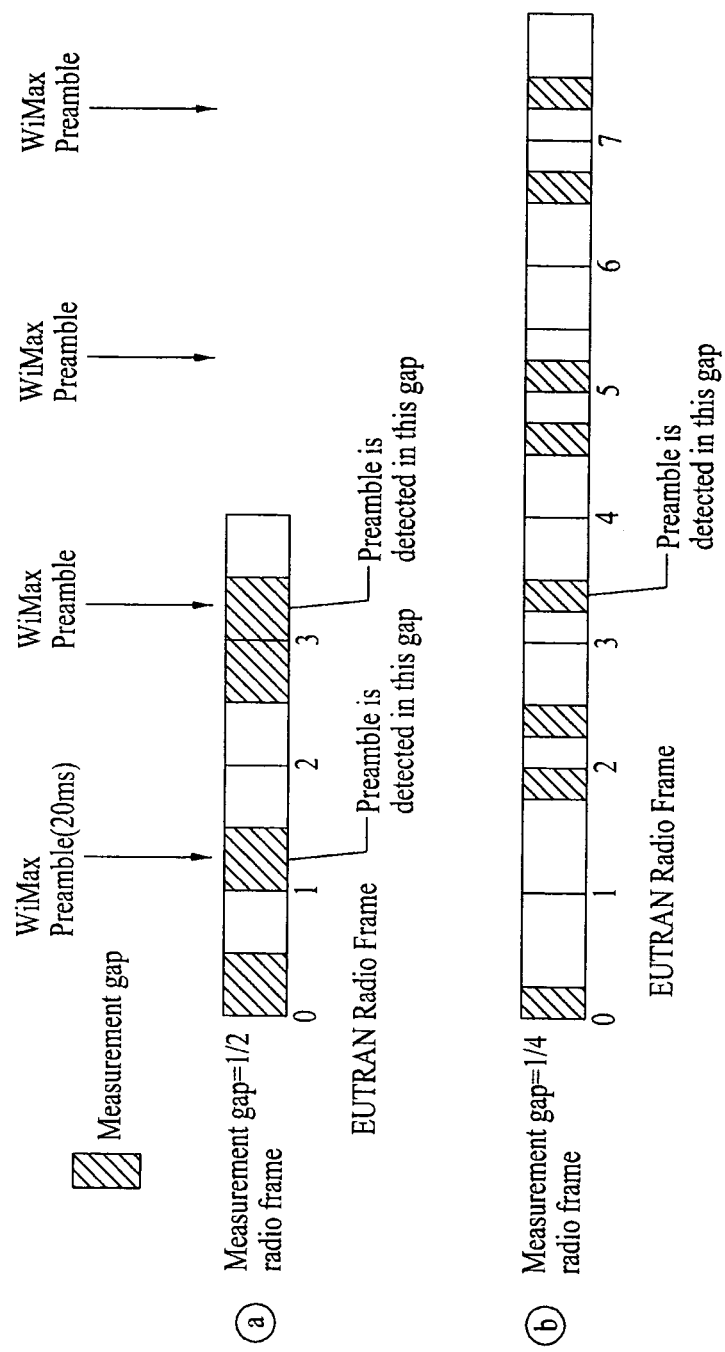
FIG. 1 is a view illustrating a process for discovering a preamble of an adjacent WiMAX base station according to measurement gap sizes while a mobile station of an LTE system provides an E-UTRAN service.

Although FIG. 1 shows one measurement gap changing process, it is apparent that the measurement gap changing process can be performed once or more if another base station is not discovered for a prescribed time period even during the changed measurement gap.

Through a process of increasing the probability of receiving the preamble of another base station by the measurement gap changing process, the mobile station receives the preamble from another base station, that is, from the base station #2 of the second communication system.

Using the foregoing-described method for receiving the preamble of another communication system, the preamble may be more efficiently received when a preamble transmission period of the base station of another communication system is not known. Hereinafter, a method of efficiently receiving a preamble using information about the preamble transmission period of the base station will be described.

Identification (ID) information about the base station #2 can be acquired through the preamble of the base station #2. Assuming that a cell ID is assigned to each base station, base station ID information may be a cell ID.

The mobile station acquires the base station ID information through the received preamble and transmits the ID information of the base station #2 to the base station #1 in step 15. If the ID information of the base station #2 is transmitted to the base station #1, information as to a preamble transmission period of the base station #2 which has transmitted the preamble can be acquired from the base station #1. The information as to the preamble transmission period may be a frame size for example. Upon receiving the base station ID information from the mobile station, the base station #1 transmits information about the frame size of a corresponding base station to the mobile station in step 16.

In the case where the base station #1 already knows the frame size of the base station #2, the base station #1 can directly inform the mobile station of the frame size without an additional procedure if the base station #1 receives the base station ID information from the mobile station. However, if the base station #1 does not know information about the base station #2, the base station #1 obtains information about the frame size through communication with an entity, which might know system information of the base station #2, for example, an inter-working gateway, and informs the mobile station of the frame size of the base station #2.

The mobile station which has received information about the frame size of the base station #2 from the base station #1 re-changes the measurement gap based on the received frame size. That is, if the frame size of the base station #2 is known, since a preamble is transmitted at a transmission start part of each frame, the preamble transmission period of the base station #2 can be known. Accordingly, if the measurement gap is re-changed according to the frame size, the base station #2 can further receive the preamble without wasting resources because the base station #2 performs measurement in synchronization with preamble transmission timing.

If the mobile station desires to perform handover to the discovered base station, the base station #2 for example, the mobile station should confirm channel information about the base station #2. It is difficult to recognize the channel information by one received preamble and the channel information can be acquired by receiving a plurality of preambles.

The mobile station receives one or more preambles during a measurement gap synchronized with the preamble transmission period of the base station #2 in step 18 and obtains channel quality information about the base station #2 in step 19. If the obtained channel quality value is above a prescribed threshold value, the mobile station may start handover to the base station #2.

Figure 3:
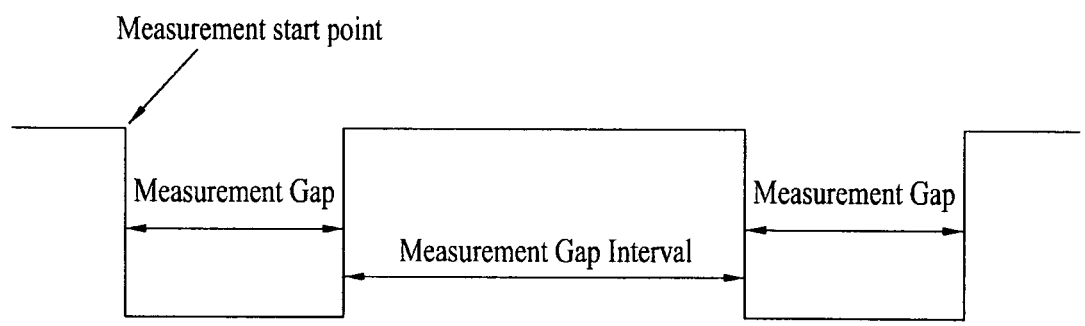
FIG. 3 is a view illustrating parameters used to determine a measurement gap according to an exemplary embodiment of the present invention.

FIG. 3 is a view illustrating parameters used to determine a measurement gap according to an exemplary embodiment of the present invention.

To start measurement, a mobile station which is communicating with a base station should know a measurement start reference time point. After the reference time point, the mobile station performs measurement at a regular or irregular time interval according to scheduling information of the base station. An interval until the next measurement is started may be regular or irregular according to scheduling information.

The measurement gap scheduling information includes not only information about a time point at which measurement is started but also information about the size of one measurement gap and as to how a measurement gap is assigned. The above information may be referred to as a measurement start point, a measurement gap size, and a measurement gap assignment scheme. The measurement gap scheduling information is provided by the base station to the mobile station periodically or through control signaling.

The measurement start point is a parameter representing a time point indicating that the mobile station which is communicating with the base station starts measurement for another base station. The measurement start point may be determined based on a subframe number as an initial frame number. After this reference time point, the mobile station starts measurement according to the measurement gap scheduling information received from the base station. The measurement gap size is the size of one measurement gap and may be determined as a relative value for one frame size.

The measurement gap assignment scheme for assigning a measurement gap is classified into a periodic method and an aperiodic method. When the measurement gap is assigned to periodically perform measurement, a measurement gap interval, and a measurement window which is an interval during which measurement is performed may be elements for assigning the measurement gap.

When the measurement gap is assigned to aperiodically perform measurement, the measurement window, and the number of times measurement is performed per window, that is, a measurement frequency, may be elements for assigning the measurement gap. The measurement window may be determined by the number of frames in which measurement is performed.

As mentioned above, during measurement gap scheduling, the base station determines the above-described parameters and informs the mobile station of the parameters as the measurement gap scheduling information.

The base station may directly inform the mobile station of each parameter value of the measurement gap scheduling information. Alternatively, the base station may have a measurement gap pattern table shared with the mobile station and may inform the mobile station of index information based on the measurement gap pattern table. Since the amount of scheduling information can be reduced using the index information based on this table, communication efficiency is increased and resources can be effectively used.

The base station sets each parameter value of the measurement gap scheduling information in the measurement gap pattern table and informs the mobile station of measurement start point information and determined index information when transmitting initial measurement gap scheduling information. The mobile station then performs measurement during an assigned measurement gap according to the received measurement start point and index information.

Table 1 illustrates an example of the measurement gap pattern table.

TABLE 1

| Index | Measurement Gap Size | Measurement Gap Interval (Frame) | Measurement Window (Frame) | Measurement Frequency (/window) |
|-------|---------------------|----------------------------------|----------------------------|----------------------------------|
| 1 | 1 | 5 | 10 | N/A |
| 2 | 1 | 3 | 10 | N/A |
| 3 | 1 | Random | 8 | 3 |
| 4 | 2 | Random | 8 | 4 |
| 5 | 2 | Random | 4 | 4 |

Assuming that the base station transmits information indicating index 2 of the measurement gap pattern table together with measurement start point information to inform the mobile station of measurement gap scheduling information, the mobile station periodically performs measurement with a measurement gap interval of 3 frames during a measurement gap having a size of 1 within a measurement window of 10 frames from a measurement start point as indicated in Table 1.

If the base station transmits information indicating index 4 of the measurement gap pattern table together with measurement start point information to inform the mobile station of measurement gap scheduling information, the mobile station randomly performs measurement four times during a measurement gap having a size of 2 within a measurement window of 8 frames from a measurement start point as indicated in Table 1. The random assignment may be performed by the mobile station and reported to the base station. Conversely, the random assignment may be performed by the base station and reported to the mobile station. In Table 1, if the measurement gap interval is random, it is desirable that the base station know the randomly assigned measurement gap through information exchange with the mobile station.

Since the base station informs the mobile station of the index indicating measurement gap scheduling information of a specific pattern, the mobile station can know the measurement gap scheduling information and flexibly change a measurement gap.

Hereinafter, a method for changing the measurement gap using the above-described measurement gap scheduling information will be described in detail. Especially, the following exemplary embodiments describe the case where a mobile station which is communicating in an LTE system desires to perform handover to a base station of a WiMAX system. The configuration of a radio interface of the mobile station may be applied irrespective of one radio interface or dual radio interfaces.

A base station of an LTE system will be referred to as an E-nodeB and a base station of a WiMAX system will be referred to as a WiMAX BS.

When the mobile station performs handover from the LTE system to the WiMAX system or from the WiMAX system to the LTE system, an E-UTRAN based mobile station should be able to discover an adjacent WiMAX system before attempting to perform the handover. To this end, the base station schedules a scanning interval, that is, a measurement gap to discover the WiMAX system for a prescribed time.

Figure 4:
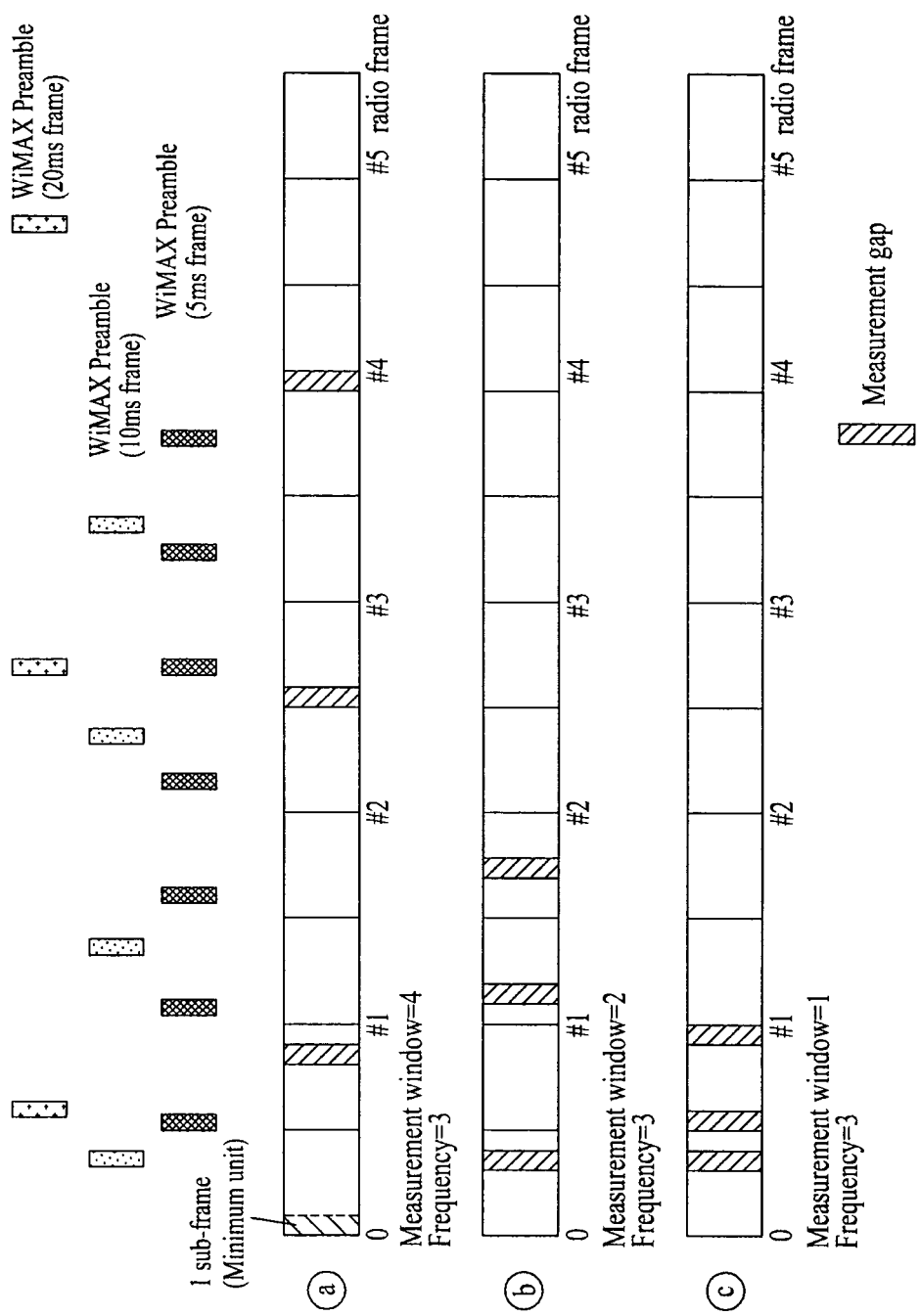
FIG. 4 is a view illustrating a method for changing a measurement gap according to an exemplary embodiment of the present invention.

FIG. 4 is a view illustrating a method for changing a measurement gap according to an exemplary embodiment of the present invention.

In the method for changing a measurement gap according to the embodiment of the present invention, if a WiMAX BS is not found during an initial setting window, measurement gap scheduling parameters are changed to decrease the size of an initially set measurement window and to maintain a measurement frequency per window.

Assuming that WiMAX BSs having frame sizes of 5, 10, and 20 ms are present, preambles are periodically transmitted as shown in FIG. 4.

In FIG. 4, (a) shows a measurement method according to an initially set measurement gap. In the initially set measurement gap, a measurement window size is 4 and a measurement frequency is 3. That is, measurement is randomly performed 3 times during 4 frames. If the WiMAX BS is not discovered during the initially set measurement gap, the measurement scheduling parameters are changed.

In FIG. 4, (b) shows a measurement method according to a changed measurement gap. In the changed measurement gap, a measurement window size is 2, which is half the initially set window size, and a measurement frequency is 3, which is the same as the initially set measurement frequency. That is, measurement is randomly performed 3 times during 2 frames. Therefore, a measurement gap interval is substantially reduced as compared to (a), thereby increasing the probability of discovering an adjacent base station. If the WiMAX BS is not discovered even during the changed measurement gap, the measurement scheduling parameters can be changed again.

In FIG. 4, (c) shows a measurement method according to a re-changed measurement gap. In the re-changed measurement gap, a measurement window size is 1, which is half the set window size in (b), and a measurement frequency is 3, which is the same as the initially set measurement frequency. Namely, measurement is randomly performed 3 times during one frame. This method substantially reduces the measurement gap interval as compared to (a) and (b), thereby increasing the probability of discovering the WiMAX BS.

Figure 5:
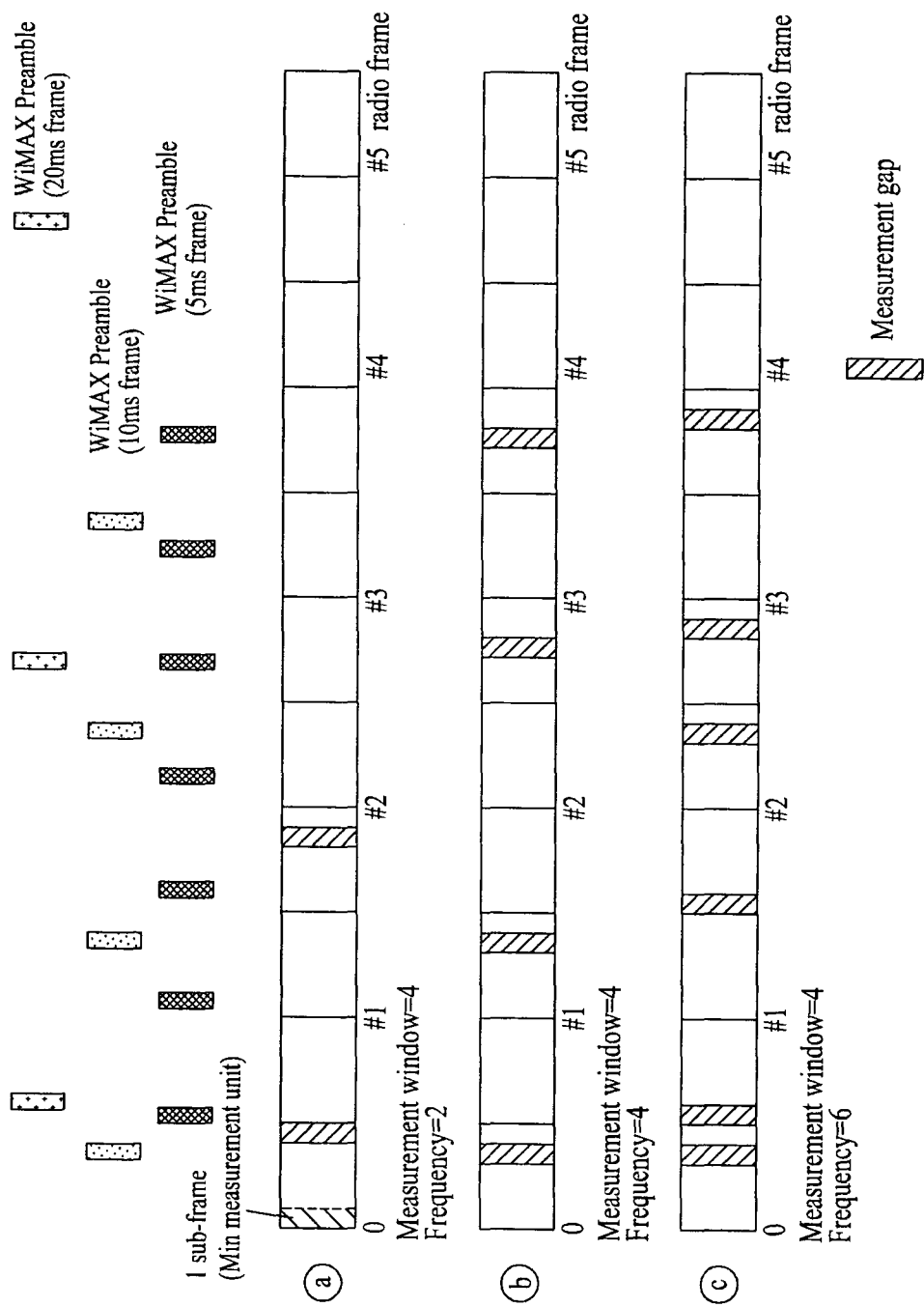
FIG. 5 is a view illustrating a method for changing a measurement gap according to another exemplary embodiment of the present invention.

FIG. 5 is a view illustrating a method for changing a measurement gap according to another exemplary embodiment of the present invention.

In the method for changing a measurement gap, if a WiMAX BS is not found during an initially set window, measurement gap scheduling parameters are changed to increase the measurement frequency per window while maintaining the size of the initially set window.

Assuming that WiMAX BSs having frame sizes of 5, 10, and 20 ms are present, preambles are periodically transmitted as shown in FIG. 5.

In FIG. 5, (a) shows a measurement method according to an initially set measurement gap. According to the initially set measurement gap, a measurement window size is 4 and a measurement frequency is 2. That is, measurement is randomly performed twice during 4 frames. If the WiMAX BS is not discovered during the initially set measurement gap, the measurement scheduling parameters are changed.

In FIG. 5, (b) shows a measurement method according to a changed measurement gap. In the changed measurement gap, a measurement window size is 4, which is the same as the initially set window size, and a measurement frequency is 4, which is twice the initially set measurement frequency. That is, measurement is randomly performed 4 times during 4 frames. Therefore, a measurement gap interval is substantially reduced as compared to (a), thereby increasing the probability of discovering an adjacent base station. If the WiMAX BS is not discovered even during the changed measurement gap, the measurement scheduling parameters can be changed again.

In FIG. 5, (c) shows a measurement method according to a re-changed measurement gap. In the re-changed measurement gap, a measurement window size is 4, which is the same as the initially set window size, and a measurement frequency is 6, which is increase by 2 from the measurement frequency set in (b). That is, measurement is randomly performed 6 times during 4 frames. This method substantially reduces the measurement gap interval as compared to (a) and (b) of FIG. 5, thereby increasing the probability of discovering the WiMAX BS.

In this exemplary embodiment, since the initially set measurement window value is not changed, a time point at which the measurement gap is configured by successive frames can be delayed compared with the exemplary embodiment of FIG. 4 and a service interruption time from the base station can be reduced.

The method for changing the measurement gap described with reference to FIGS. 4 and 5 may be repeatedly performed until an adjacent base station is discovered. Although the measurement gap may be changed by scheduling by the base station, the mobile station may actively re-schedule the measurement gap after receiving the initial measurement gap scheduling information from the base station, thereby increasing the probability of discovering an adjacent base station. In this case, a basic measurement gap size may be kept constant or may be changed. If scheduling is changed by the mobile station, it is desirable to report such information to the base station.

Through the above-described method for changing the measurement gap, the mobile station can efficiently perform discovery of an adjacent base station. Hereinafter, a method for efficiently receiving a preamble after the mobile station discovers an adjacent base station, that is, after a preamble of the adjacent base station is initially received will be described in detail.

If a preamble transmission period of an adjacent base station is not known, the measurement gap is randomly assigned. However, if the preamble transmission period of the adjacent base station is recognized, the measurement gap may be periodically assigned according to the transmission period to receive one or more preambles without wasting resources.

Figure 6:
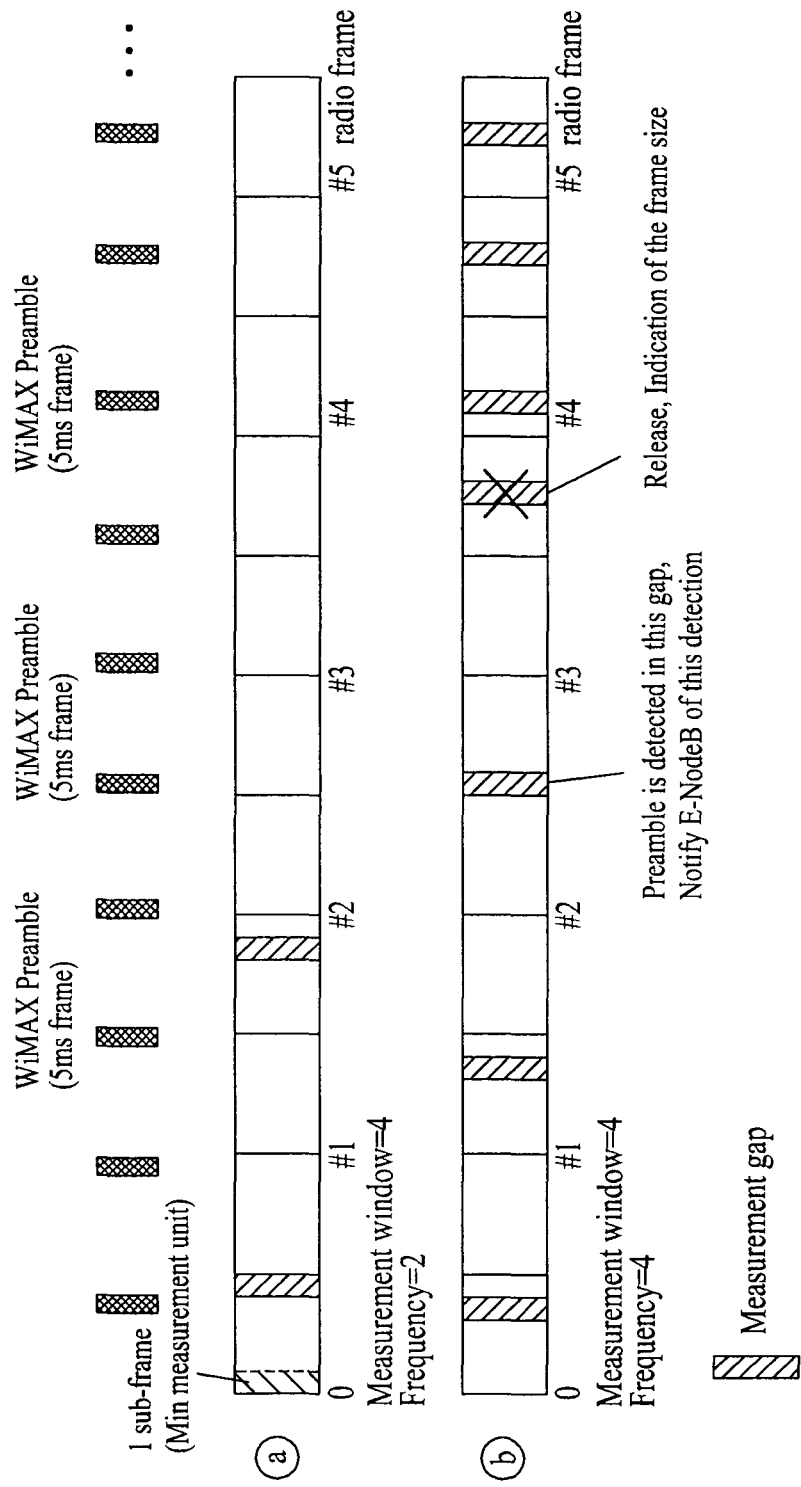
FIG. 6 is a view illustrating a method for changing a measurement gap according to still another exemplary embodiment of the present invention.

FIG. 6 is a view illustrating a method for changing a measurement gap according to still another exemplary embodiment of the present invention.

This exemplary embodiment is applied when a communicating base station knows a preamble transmission period of an adjacent base station discovered by a mobile station. It is also assumed that a method for increasing a measurement frequency while maintaining a measurement window size is applied as a measurement gap changing method.

Referring to FIG. 6, an example is shown of a method for determining a window-based measurement gap when a mobile station of an LTE system performs handover to a WiMAX system from the LTE system. Assuming that a WiMAX BS has a frame size of 5 ms, preambles are periodically transmitted as shown in FIG. 6.

In FIG. 6, (a) shows a measurement method according to an initially set measurement gap. According to the initially set measurement gap, a measurement window size is 4 and a measurement frequency is 2. That is, measurement is randomly performed twice during 4 frames. If the WiMAX BS is not discovered during the initially set measurement gap, measurement scheduling parameters are changed.

In FIG. 6, (b) shows a measurement method according to a changed measurement gap. In the changed measurement gap, a measurement window size is 4, which is the same as the initially set window size, and a measurement frequency is 4, which is increased by 2 from the initially set measurement frequency. That is, measurement is randomly performed 4 times during 4 frames. In this case, a preamble of the WiMAX system is detected at the third measurement gap.

The mobile station obtains information capable of identifying a WiMAX BS, a cell ID for example, from a sequence of the received preamble and transmits the cell ID to a currently communicating E-nodeB. Since the E-nodeB already knows system information of the WiMAX BS, the E-nodeB confirms the WiMAX BS using the received cell ID and notifies the mobile station of cell information including a frame size for the confirmed WiMAX BS. The cell information may include system information.

The mobile station may re-change a measurement gap using the frame size received from the E-nodeB. To further receive the preamble of the WiMAX BS, the mobile station changes the measurement gap according to a preamble transmission period. Since the preamble transmission period has a value corresponding to a frame size when considering that the preamble is transmitted at the first part of each frame, the preamble can be efficiently received by re-changing the measurement gap using the frame size.

As another method, the E-nodeB receiving the cell ID can assign a measurement gap after an offset corresponding to a WiMAX frame size from a time the cell ID is received at. In this case, it is desirable to determine a measurement gap interval using the WiMAX frame size.

To periodically further receive the preamble of the WiMAX BS after the WiMAX frame size since the first preamble has been detected, the mobile station further receives at least one preamble during a periodically assigned measurement gap, thereby measuring a channel station through a downlink signal.

If the E-nodeB does not have frame size information of the WiMAX system for the cell ID transmitted by the mobile station, the E-nodeB may acquire corresponding information through the WiMAX BS or a middle entity.

Figure 7:
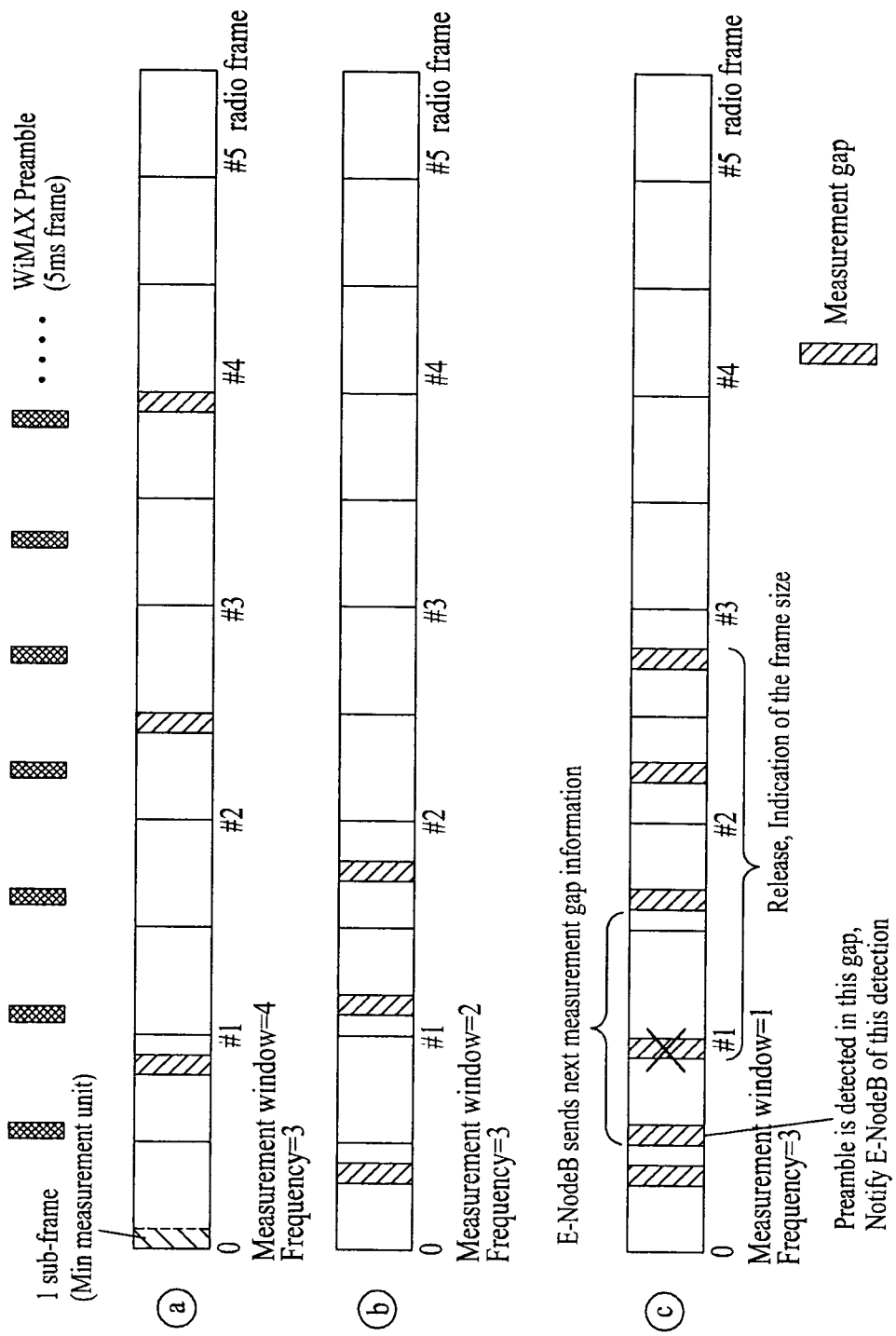
FIG. 7 is a view illustrating a method for changing a measurement gap according to a further exemplary embodiment of the present invention.

FIG. 7 is a view illustrating a method for changing a measurement gap according to a further exemplary embodiment of the present invention.

This exemplary embodiment is applied when a communicating base station does not sufficiently know system information about an adjacent base station of another communication system discovered by the mobile station. This exemplary embodiment shows a procedure performed by a mobile station to discover a preamble of an adjacent base station, transmit a cell ID of another communication system to the base station, and wait for the reception of additional information.

An E-nodeB may request that an adjacent WiMAX BS transmit additional information such as downlink channel descriptor (DCD) and uplink channel descriptor (UCD) within the next few frames for the mobile station which may perform handover to the WiMAX BS.

Referring to FIG. 7, an example is shown of a method for determining a window-based measurement gap when a mobile station of an LTE system performs handover to a WiMAX system from the LTE system. Assuming that the WiMAX BS has a frame size of 5 ms, preambles are periodically transmitted as shown in FIG. 7. It is assumed that a measurement gap changing method for reducing a measurement window size and maintaining a measurement frequency is applied.

In FIG. 7, (a) shows a measurement method according to an initially set measurement gap. In the initially set measurement gap, a measurement window size is 4 and a measurement frequency is 3. That is, measurement is randomly performed 3 times during 4 frames. If the WiMAX BS is not discovered during the initially set measurement gap, measurement scheduling parameters are changed.

In FIG. 7, (b) shows a measurement method according to a changed measurement gap. According to the changed measurement gap, a measurement window size is 2, which is half the initially set window size, and a measurement frequency is 3, which is the same as the initially set measurement frequency. That is, measurement is randomly performed 3 times during 2 frames. If the WiMAX BS is not discovered even during the changed measurement gap, the measurement scheduling parameters can be changed again.

In FIG. 7, (c) shows a measurement method according to a re-changed measurement gap. In the re-changed measurement gap, a measurement window size is 1, which is half the changed set window size of (b), and a measurement frequency is 3, which is the same as the initially set measurement frequency. Namely, measurement is randomly performed 3 times during one frame. In this case, a preamble of the WiMAX system is received at the second measurement gap.

The mobile station obtains information capable of identifying the WiMAX BS, a cell ID for example, through a sequence of the received preamble and transmits the cell ID to the E-nodeB which is the base station of the communicating LTE system. The E-nodeB informs the mobile station of the frame size of the WiMAX system through the received cell ID.

If the E-nodeB does not have frame size information of the WiMAX system for the cell ID transmitted by the mobile station, the E-nodeB may acquire corresponding information through the WiMAX BS or a middle entity. When the WiMAX BS transmits system information through communication with an adjacent WiMAX BS, the E-nodeB may request that the WiMAX BS transmit additional information such as DCD and UCD. Therefore, when the mobile station detects an additional preamble, the information about the DCD and UCD can be previously acquired.

The mobile station can re-change a measurement gap through the frame size information received from the E-nodeB. The mobile station adjusts the measurement gap to a preamble transmission period to further receive the preamble of the WiMAX BS. Since the preamble transmission period becomes a value corresponding to a frame size when considering that the preamble is transmitted at the first part of each frame, if the measurement gap is re-changed through the frame size, the preamble can be efficiently received.

As another method, the E-nodeB receiving the cell ID may assign a measurement gap after an offset corresponding to a WiMAX frame size from a time the cell ID is received at. In this case, it is desirable to determine a measurement gap interval by the WiMAX frame size.

To periodically further receive the preamble of the WiMAX BS after the WiMAX frame size since the first preamble has been detected, the mobile station further receives at least one preamble through a periodically assigned measurement gap, thereby measuring a channel station through a downlink signal.

Figure 8:
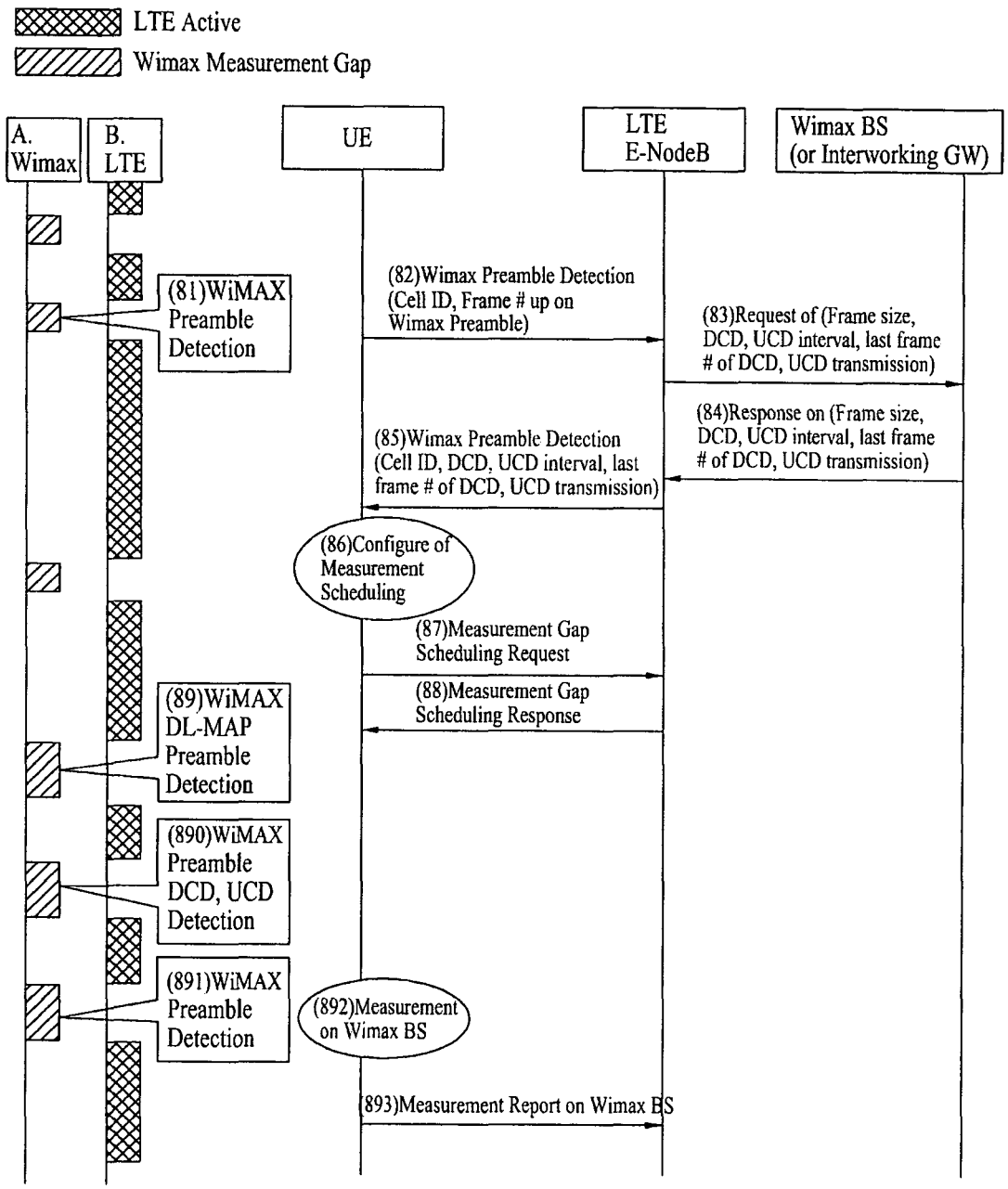
FIG. 8 is a flow chart illustrating a method for a mobile station to change a measurement gap according to an exemplary embodiment of the present invention.

FIG. 8 is a flow chart illustrating a method for a mobile station to change a measurement gap according to an exemplary embodiment of the present invention.

Referring to FIG. 8, a method for a communicating mobile station in an LTE system which has successfully received a preamble of a WiMAX BS to obtain information necessary for handover by periodically changing a measurement gap is shown. In FIG. 8, 'A' and 'B' refer to frames along a time axis of the mobile station having one radio interface in a WiMAX system and an LTE system, respectively.

The mobile station (or UE) receives a preamble of the WiMAX system in step 81. The mobile station acquires a cell ID of the WiMAX system through sequence information of the received preamble and stores a frame number of the WiMAX system, a preamble of which has been detected.

The mobile station transmits the cell ID and the frame number to an E-nodeB in step 82 to inform the E-nodeB that an adjacent WiMAX system has been discovered. The E-nodeB which has received the cell ID and the frame number from the mobile station requests a WiMAX frame size corresponding to a corresponding cell through communication with the WiMAX BS or a middle gateway for inter-working between RATs in step 83.

If the E-nodeB desires to inform the mobile station of additional information about an adjacent WiMAX BS, the E-nodeB may request that the WiMAX BS transmit the additional information. In this case, the E-nodeB transmits the frame number received from the mobile station so that the adjacent WiMAX BS can inform the E-nodeB of corresponding additional information after the frame number.

The additional information may be cell information including system information such as DCD and UCD. The requested additional information may be transmission intervals of the DCD and UCD, frame numbers of the DCD and UCD transmitted after the received frame number, and the like.

In step 84, the WiMAX BS transmits a response to the request in step 83. The response may include transmission intervals of the DCD and UCD and frame numbers of the DCD and UCD transmitted after the received frame number, as well as a frame size. In step 85, the E-nodeB transmits WiMAX system information received in step 84 to the mobile station.

The mobile station can recognize a preamble transmission point of the WiMAX system by the frame number stored in step 81 and an offset corresponding to the frame size received in step 85, and can estimate a frame number at which the UCD and DCD information is to be transmitted. Therefore, the mobile station changes a measurement gap using the frame number stored in step 81 and information received in step 85 to re-schedule the measurement gap in step 86.

The mobile station transmits information about the measurement gap changed in step 86 to the E-nodeB to request the E-nodeB to assign the measurement gap in step 87. The E-nodeB transmits a response to the request in step 87 to the mobile station to inform the mobile station whether the measurement gap is assigned in step 88.

If the measurement gap has been successfully assigned in step 88, the mobile station can periodically receive preambles of the WiMAX system every measurement gap interval requested in step 87 as indicated in steps 89, 890, and 891. Thus the mobile station has the opportunity to measure channel quality for the WiMAX system in step 892 by receiving a plurality of preambles of the WiMAX system.

The mobile station may previously acquire DCD and UCD information of the WiMAX system and have the opportunity of reducing a delay when performing a registration procedure to the WiMAX system.

The mobile station transmits a channel quality measurement result for the WiMAX system to the base station in step 893. Then the base station or the mobile station may determine whether to perform handover to the WiMAX system of the mobile station based on information about the channel quality measurement result.

Figure 9:
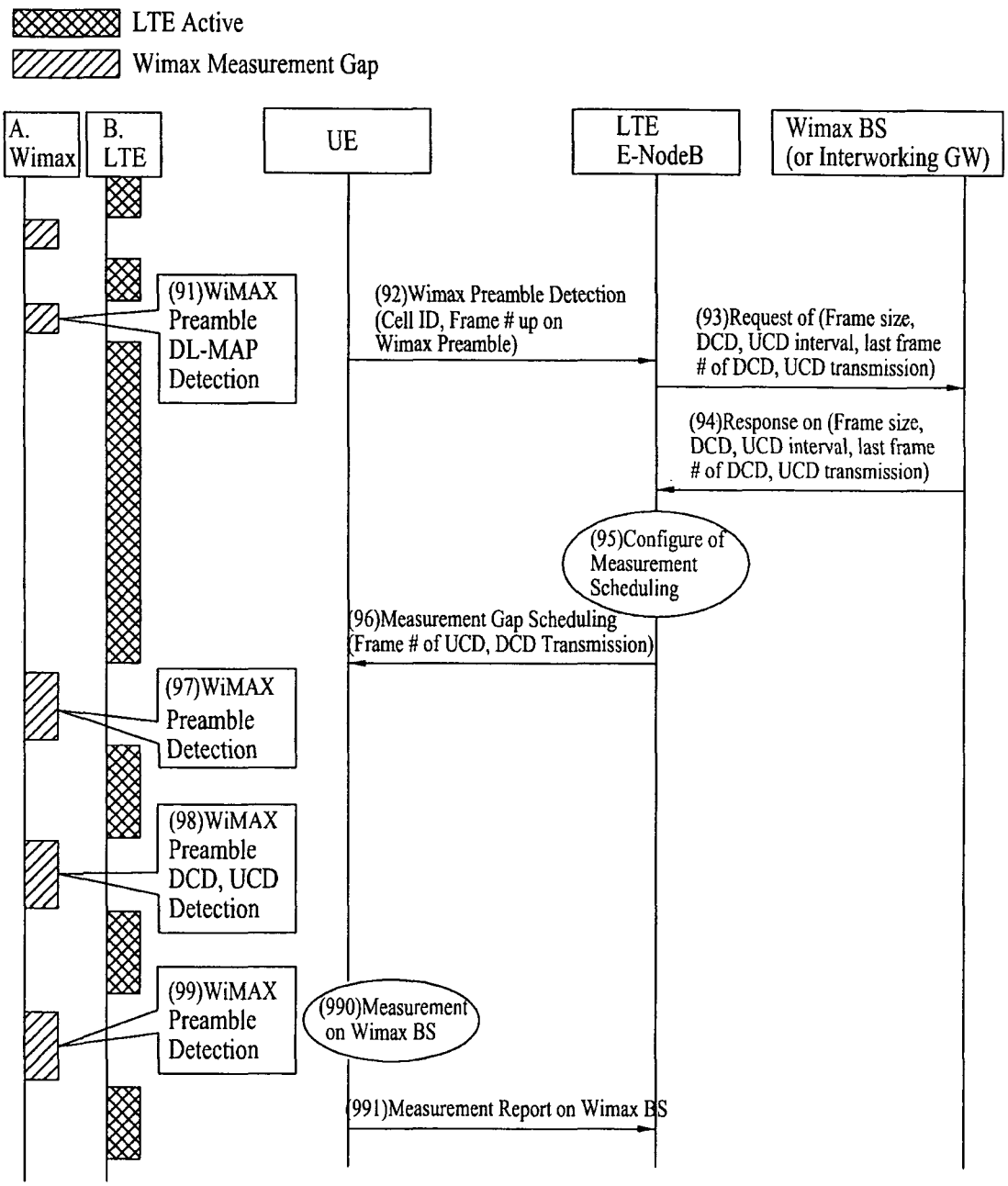
FIG. 9 is a flow chart illustrating a method for a base station to change a measurement gap according to an exemplary embodiment of the present invention.

FIG. 9 is a flow chart illustrating a method for a base station to change a measurement gap.

Referring to FIG. 9, a method for a base station to obtain information necessary for handover by periodically changing a measurement gap with respect to a communicating mobile station in an LTE system which has successfully received a preamble of a WiMAX BS is shown. In FIG. 9, 'A' and 'B' refer to frames along a time axis of the mobile station having one radio interface in a WiMAX system and an LTE system, respectively.

A process of FIG. 9 is similar to a process of FIG. 8 but the measurement gap is re-scheduled by the base station. Steps 91 to 94 are as described in FIG. 8. That is, the mobile station receives a preamble of the WiMAX system, transmits a cell ID and a frame number to the base station, and stores the cell ID and the frame number. If the mobile station 82 informs the E-nodeB that a preamble of the WiMAX system has been received, the E-nodeB receives information about a frame size, transmission intervals of DCD and UCD, and frame numbers of DCD and UCD to be transmitted after the received frame number through communication with the WiMAX BS.

In step 95, the base station re-schedules the measurement gap by changing the measurement gap using the frame number and information received in step 94. Then, in step 96, the E-nodeB transmits information about the measurement gap changed in step 95 to the mobile station to notify the mobile station of the changed measurement gap.

The mobile station receiving measurement gap scheduling information changed in step 96 can periodically receive preambles of the WiMAX system every measurement gap interval requested in step 87 as indicated in steps 97, 98, and 99. Thus the mobile station has the opportunity to measure channel quality for the WiMAX system in step 990 by receiving a plurality of preambles of the WiMAX system.

The mobile station may previously acquire DCD and UCD information of the WiMAX system and have the opportunity of reducing a delay when performing a registration procedure to the WiMAX system.

The mobile station transmits a channel quality measurement result for the WiMAX system to the base station in step 991. Then the base station or the mobile station may determine whether to perform handover to the WiMAX system of the mobile station based on information about the channel quality measurement result.

The method for receiving the preamble signal of another communication system and the method for changing the measurement gap may be applied to an intra-frequency/RAT handover as well as an inter-frequency/RAT handover.

It is apparent that the present invention may be embodied by a combination of claims which do not have an explicit cited relation in the appended claims or may include new claims by amendment after application.

Embodiments of the present invention may be achieved by various means, for example, hardware, firmware, software, or a combination thereof. In a hardware configuration, a method for receiving a preamble signal from other communication systems and a method for adaptively changing a measurement gap according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method for receiving a preamble signal from a base station of another communication system and a method for adaptively changing a measurement gap according to exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data with the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving a preamble signal from a base station of a second communication system by a mobile station in a first communication system, the method comprising:
   receiving, by the mobile station, measurement gap scheduling information for scheduling a measurement gap from a base station of the first communication system;
   if the preamble signal of the base station of the second communication system is not received during the measurement gap, changing the measurement gap by the mobile station,
   wherein a measurement gap interval is decreased according to the changed measurement gap; and
   receiving, by the mobile station, the preamble signal of the base station of the second communication system during the changed measurement gap,
   wherein the base station of the first communication system receives a cell ID (Identity) of the second communication system and assigns the measurement gap after an offset from a time the cell ID is received, the offset corresponding to a frame size, and the changed measurement gap is determined using the frame size.

2. The method according to claim 1, wherein no signal is transmitted and received to and from the base station of the first communication system during the measurement gap.

3. The method according to claim 1, wherein the measurement gap scheduling information includes a measurement gap size and a measurement gap assignment element.

4. The method according to claim 3, wherein the changing the measurement gap changes at least one of the measurement gap size and the measurement gap assignment element.

5. The method according to claim 3, wherein the measurement gap assignment element includes at least one of the measurement gap interval, a measurement window, and a number of times a measurement is performed within the measurement window.

6. The method according to claim 1, wherein the measurement gap scheduling information is index information based on a measurement gap pattern table in which measurement gap scheduling parameter values are set.

7. The method according to claim 1, further comprising:
transmitting base station identification information obtained from the preamble signal of the base station of the second communication system to the base station of the first communication system; and
receiving system information for the second communication system from the base station of the first communication system.

8. The method according to claim 1, wherein the receiving the preamble signal comprises:
receiving the preamble signal of the base station of the second communication system at least once to obtain channel quality information for the second communication system.

9. The method according to claim 8, further comprising:
if a value of the obtained channel quality information for the second communication system is above a prescribed reference, performing, by the mobile station, a handover to the base station of the second communication system.

10. A method for receiving a preamble signal from a base station of a second communication system by a mobile station in a first communication system, the method comprising:
if the preamble signal of the base station of the second communication system is not received during a measurement gap assigned from a base station of the first communication system, adaptively changing, by the mobile station, the measurement gap,
wherein a measurement gap interval is decreased according to the changed measurement gap;
receiving, by the mobile station, the preamble signal of the base station of the second communication system during the changed measurement gap;
re-changing, by the mobile station, the changed measurement gap to correspond to a transmission period of the preamble signal of the base station of the second communication system; and
further receiving, by the mobile station, the preamble signal of the base station of the second communication system during the re-changed measurement gap to obtain channel information for the base station of the second communication system,
wherein the base station of the first communication system receives a cell ID (Identity) of the second communication system and assigns the measurement gap after an offset from a time the cell ID is received, the offset corresponding to a frame size, and the changed measurement gap is determined using the frame size.

11. A mobile station configured to operate in a first communication system and receive a preamble signal from a base station of a second communication system, the mobile station comprising:
a processor configured to
receive information about scheduling a measurement gap from a base station of the first communication system,
if the preamble signal of the base station of the second communication system is not received during the measurement gap, change the measurement gap,
wherein a measurement gap interval is decreased according to the changed measurement gap, and
receive the preamble signal of the base station of the second communication system during the changed measurement gap,
wherein the base station of the first communication system receives a cell ID (Identity) of the second communication system and assigns the measurement gap after an offset from a time the cell ID is received, the offset corresponding to a frame size, and the changed measurement gap is determined using the frame size.

* * * * *